United States Patent [19]

Asano

[11] Patent Number: 5,222,119
[45] Date of Patent: Jun. 22, 1993

[54] COMMUNICATION SYSTEM AND A METHOD, TO DETECT A POWER EXPOSURE OF A COMMUNICATION LINE

[75] Inventor: Hiroyuki Asano, Kawasaki, Japan
[73] Assignee: Fujitsu Limited, Kanagawa, Japan
[21] Appl. No.: 778,549
[22] Filed: Oct. 18, 1991
[30] Foreign Application Priority Data
  Oct. 20, 1990 [JP] Japan .................. 2-283217
[51] Int. Cl.$^5$ .................. H04M 1/24; H04B 3/46
[52] U.S. Cl. .................. 379/2; 379/32; 379/24; 379/26; 379/29
[58] Field of Search .................. 379/32, 2, 24, 26, 29, 379/30

[56] References Cited

U.S. PATENT DOCUMENTS 4,197,435  4/1980  Jackson et al. .................. 379/2

FOREIGN PATENT DOCUMENTS 64-25694  1/1989  Japan .

Primary Examiner—Stafford Schreyer
Attorney, Agent, or Firm—Nikaido, Marmelstein, Murray & Oram

[57] ABSTRACT

A telephone system comprises a multi-channel transmission apparatus for connecting a subscriber line to a telephone exchanger, where the transmission apparatus comprises: a subscriber interface for interfacing said subscriber line; a detecting circuit in the subscriber interface for detecting a change in a voltage on the subscriber line; and a discriminating circuit for discriminating whether the change detected by the detecting circuit is continuous or intermittent, upon discriminating the detected change in voltage as intermittent the discriminating circuit outputs a first alarm signal. The discriminating circuit may be formed of a software counter which counts a number of the intermittent signals for a predetermined period. The software counter does not require a bulky and expensive components, such as a 60 Hz filter. If the counted number is larger than a predetermined number the signal is determined to be intermittent. The first alarm signal may start a subscriber line tester which includes an AC voltage tester to measure an AC voltage on the subscriber line. If the measured AC voltage exceeds a predetermined criterion, it is determined that a power exposure has happened. This method allows a quick and correct detection of power exposure by merely adding a program into a currently provided micro processor, without requiring additional component.

23 Claims, 6 Drawing Sheets

COMMUNICATION SYSTEM AND A METHOD, TO DETECT A POWER EXPOSURE OF A COMMUNICATION LINE

BACKGROUND OF THE INVENTION

1. Field of the Invention

This invention relates to a communication system and a method, for detecting a power exposure of a communication subscriber line to a commercial AC (alternating current) electrical power line.

2. Description of the Related Arts

There has sometimes taken place a trouble called a power exposure, that is, a commercial AC power line of 100 or 200 volts touches a communication line, for example, a telephone subscriber line, during a construction work of the lines, causing an excessive voltage in the telephone line resulting in a damage or fire of a telephone set in a home or a remote terminal RT. In order to protect the set or the remote terminal RT from the damage, a surge-absorber, typically consisting of a varistor and a posistor, has been provided between the ground and each wire of the subscriber line. The surge-absorber is effective for some degree to protect the apparatus; however, the surge absorber must be replaced with a new one when damaged by absorbing the excessive voltage caused from the power exposure, and does not alarm the damage. In order to detect the power exposure, the remote terminal RT may have been provided with a subscriber line tester. Subscriber line tester is connected to the subscriber line periodically or upon a request from the subscriber to test the subscriber line by being initiated from a control desk provided in a central office terminal COT located at the telephone exchanger side of the transmission line, opposite from the remote terminal RT. Therefore, in these methods there is a problem in that the power exposure cannot be instantly detected. In order to instantly detect the power exposure, the remote terminal may have been provided with a power exposure detector. In this method there is a problem in that the power exposure detector, such as a 60 Hz filter which is expensive, must be provided to each wire of every subscriber lines, resulting in an increase of the space of the required component, accordingly in the appratus cost.

SUMMARY OF THE INVENTION

It is a general object of the invention to provide a system and a method to instantly and correctly detect a power exposure of a telephone line, without requiring bulky and expensive components to detect AC voltage on the telephone line.

A telephone communication system according to the present invention comprises a multi-channel transmission apparatus for connecting a subscriber line to a telephone exchanger, where the transmission apparatus comprises: a subscriber interface for interfacing said subscriber line; a detecting circuit in the subscriber interface for detecting a change in a voltage of the subscriber line; and a discriminating circuit for discriminating whether the change detected by the detecting circuit is continuous or intermittent, upon discriminating the detected change in voltage as intermittent the discriminating circuit outputs a first alarm signal. The discriminating circuit may be formed of a software counter which counts a number of the intermittent signals for a predetermined period. The software counter does not require a bulky and expensive components. If the counted number is larger than a predetermined number the signal is determined to be intermittent. The first alarm signal may start a subscriber line tester which includes an AC voltage tester to measure an AC voltage on the subscriber line. If the measured AC voltage exceeds a predetermined criterion, it is determined that a power exposure has happened.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

DESCRIPTION OF THE PREFERRED EMBODIMENT

Figure 1:
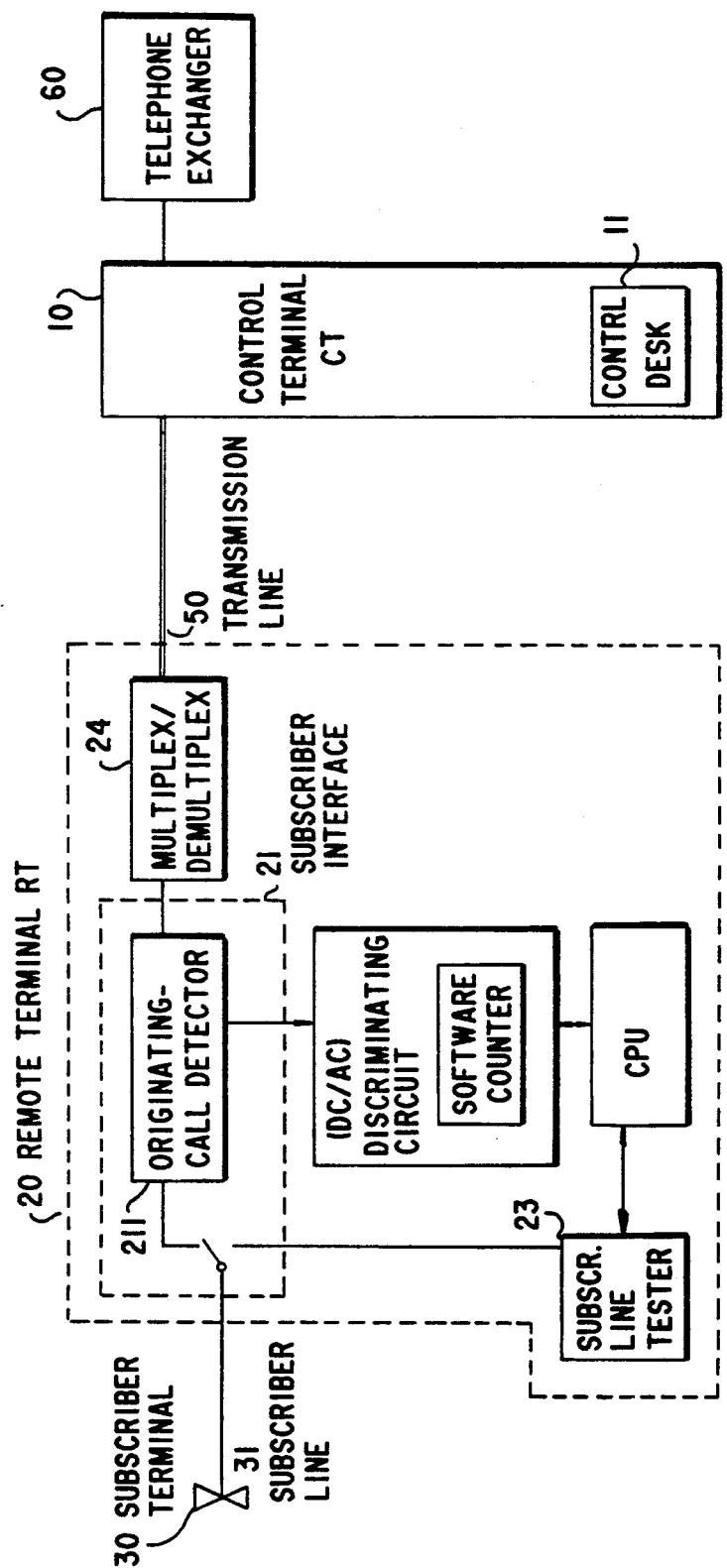
FIG. 1 shows a block diagram illustrating a telephone communication system where the present invention is embodied.
Figure 2:
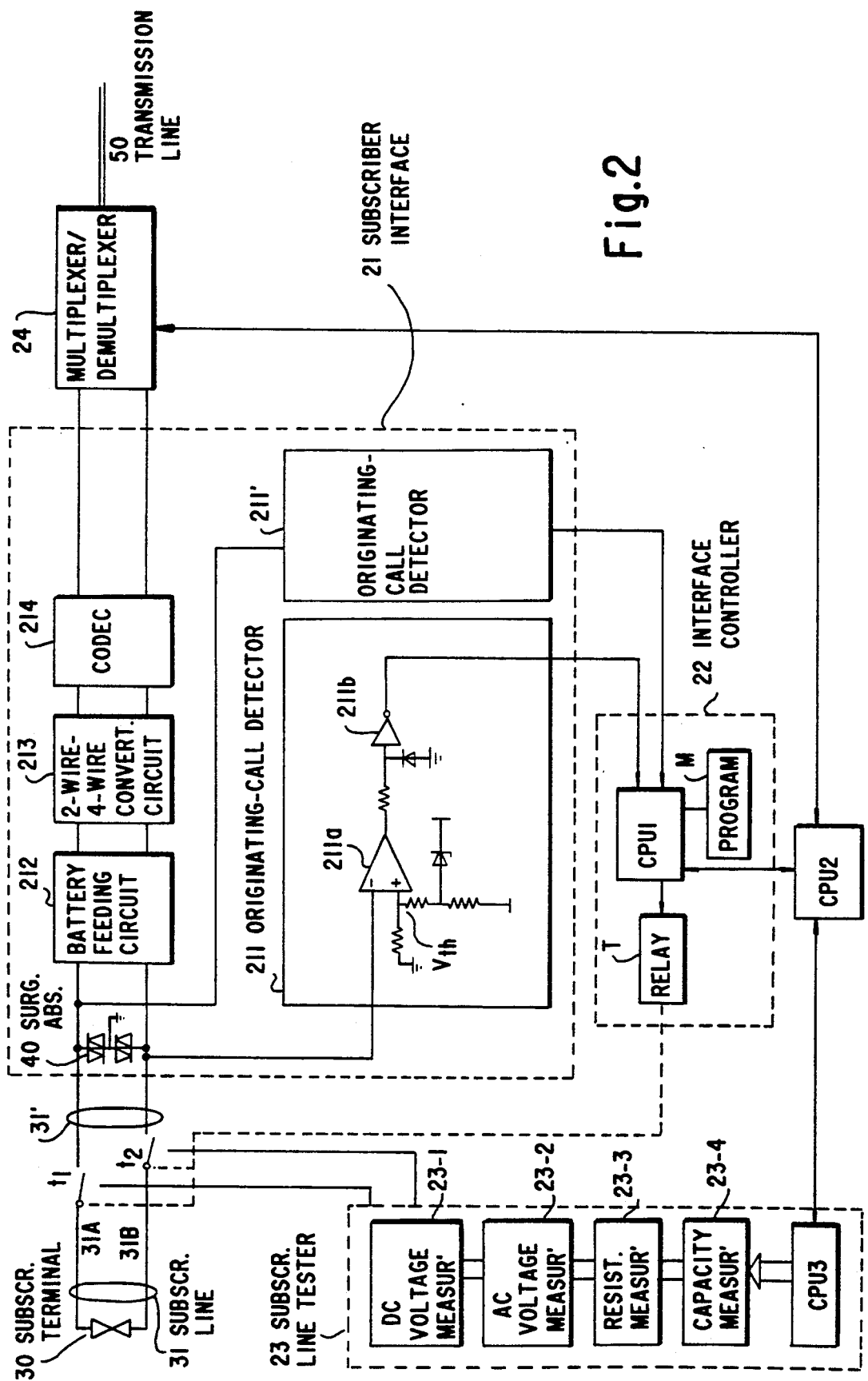
FIG. 2 shows a block diagram of a preferred embodiment of the present invention.
Figure 3:
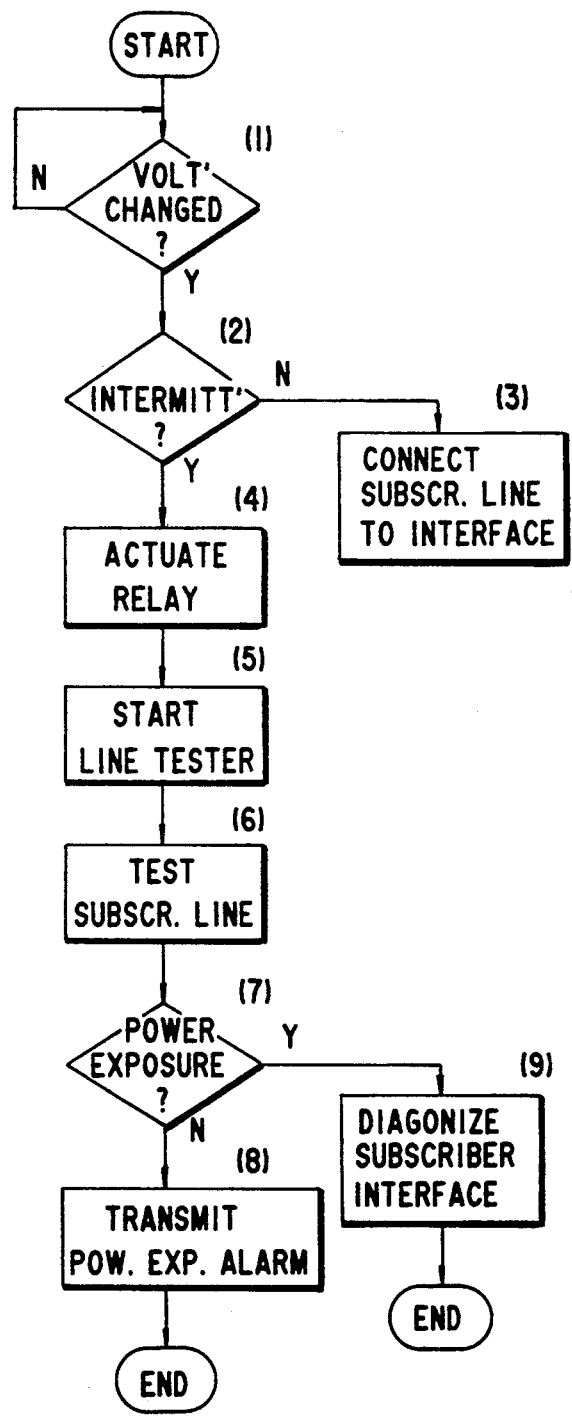
FIG. 3 shows a flow chart of the FIG. 2 preferred embodiment.

FIG. 1 is a block diagram schematically illustrating a general configuration of a telephone communication system where the present invention is embodied. FIG. 2 is a block diagram schematically illustrating a circuit configuration of a preferred embodiment of a power exposure detecting method of the present invention. A flow chart of FIG. 3 shows a general procedure of the operation of the FIG. 2 preferred embodiment. A subscriber's terminal 30, such as a telephone set or facsimile, is connected via a telephone line (subscriber line) 31 formed of two wires 31A and 31B to a remote terminal RT. In FIGS. 1 and 2, only one set of subscriber terminal 30 and subscriber interface is representatively drawn to simplify the drawing. Switch contacts $t_1$ and $t_2$ of a test relay T usually connect subscriber line 31 to a subscriber interface 21 (sometimes called a speech channel), which comprises a battery feeding circuit 212 which superposes a speech signal onto a DC (direct current) voltage, typically of $-48$ V battery) voltage, a 2-wire-4-wire converter 213 which converts the 2-wire configuration of subscriber line to a 4-wire configuration, an encoder/decoder (CODEC) 214 which encodes/decodes the analog speech signal to/from a PCM (pulse code modulation) signal, and an originating-call detector 211. Plural subscriber lines, i.e. plural PCM signals, are combined on a multi-channel transmission line 50 by a multiplexer/demultiplexer 24. Another end of transmission line 50 is connected to a central office terminal COT. Control terminal COT comprises a multiplexer/demultiplexer and an interface circuit so that the PCM signals on the multi-channel transmission line 50 are converted to/from an individual analog signals which are then handled by a telephone exchanger 60. Control terminal 10 further comprises a central controller (not shown in the figure) for controlling central office terminal COT as well as a remote terminal similar to remote terminal 20. A human operator inputs an instruction via a keyboard 11 to central controller.

Figure 4:
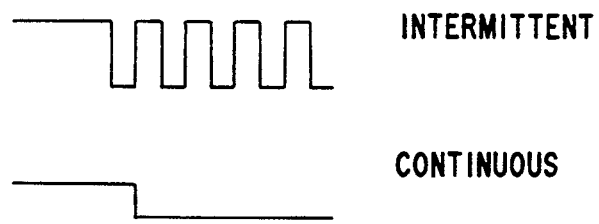
FIG. 4 shows waveforms output from a originating-call detector of the FIG. 2 preferred embodiment.

An originating-call detector 211 is connected to each wire of the subscriber line 31' connecting between contracts $t_1$ and $t_2$ and subscriber interface 21. Originating-call detector 211 is such that has been conventionally employed to detect an off-hook state of the subscriber terminal 30 having caused a change in the DC voltage level on the subscriber line 31. Originating-call detector 211 comprises a comparator 211a to compare the subscriber line voltage with a predetermined threshold level $V_{th}$. When telephone set 30 is hooked-up, the two wires of subscriber line 31 are looped so as to generate thereon the DC battery voltage, typically of −48V, which is lower than the threshold level. Comparator 211a detects a voltage beyond the threshold level $V_{th}$ and inverts its output level. Thus, an inverter connected to the output of the comparator outputs a DC voltage which is a part beyond the threshold level, i.e. a difference of the DC battery voltage and the threshold level, as shown on the lower side in FIG. 4. If a 100V AC voltage is on subscriber line 31 caused from a power exposure, output of originating-call detector 211 is of intermittent pulses having a cycle period of 20 ms for 50 Hz AC or 16.7 ms for 60 Hz AC, as shown on the upper side in FIG. 4. Output of originating-call detector 211 is periodically watched by CPU1 (step 1 in FIG. 3). Therefore, then, upon recognizing a change in the subscriber line voltage CPU1 starts discriminating whether the change is continuous or intermittent (step 2), according to a procedure explained later in detail. Output of the inverter, i.e. output of originating-call detector 211, is input to a first CPU (central processor unit) CPU1, typically formed of a micro processor unit. Another originating-call detector 211' is also connected to another one of the two wires A and B of the subscriber line 31' and to CPU1, which has been conventionally employed to form an interface controller 22 to control the operation of subscriber interface 21. CPU1 operates according to programs installed in a memory M. A program for discriminating the intermittent voltage is newly added to memory M according to the present invention, whereby the pulses input from originating-call detector 211 is discriminated continuous or intermittent, i.e. of DC or AC. Operation of CPU1 is described later further in detail. Outputs of a plurality of originating-call detectors 211 are sequentially input to a single CPU, CPU1.

Figure 5:
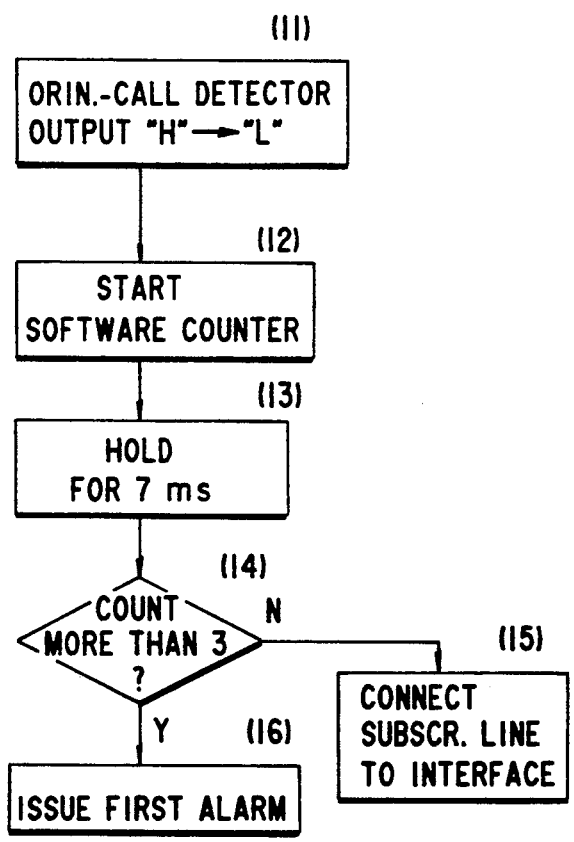
FIG. 5 shows a flow chart of a first preferred embodiment of a discriminating circuit of the present invention.

When the result of the discriminating operation is determined to be continuous by CPU1, CPU1 instructs subscriber interface 21 to connect the subscriber line (step 3) to multiplexer/demultiplexer 24, that is, to establish a speech channel. When the result of the discriminating operation is determined to be intermittent, CPU1 actuates a relay T having its contacts $t_1$ and $t_2$ to switch the connection of subscriber line 31 from subscriber interface 21 to a subscriber line tester 23 (step 4), as well as outputs a first alarm to a second CPU (CPU2), which controls total operation of remote terminal RT. Upon receiving the first alarm from CPU1, CPU2 starts the subscriber line tester 23 which is to test the status of subscriber line 31 thus floated from subscriber interface 21 (step 5). Subscriber line tester typically comprises a DC voltage tester 23-1 for measuring an DC voltage, and an AC voltage tester 23-2 for measuring AC voltage, a resistance meter 23-3 for measuring insulation resistances of two wires of the subscriber line, a capacitance meter 23-4 for measuring a capacitance of the wires of the subscriber line, and a third CPU (CPU3) to control the measuring operations of these testers. Circuit constitution of subscriber line tester 23 is shown in detail in FIG. 5. Detail of these measuring operations is described later on. On completion of the tests by subscriber line tester 23, CPU3 reports the measured results to CPU2. CPU2 confirms from the measured results whether the status is really of a power exposure, based on predetermined criteria (step 7). The criterion to determine the power exposure is chosen, for example, at 8 V r.m.s. When the status is determined to be a power exposure, CPU3 transmits a second alarm to inform this fact, and the measured data to control desk 11 in central office terminal 10 via multiplexer/demultiplexer 24 and transmission line 50 (step 8). When the status is judged not a power exposure, CPU3 instruct CPU1 to diagnose subscriber interface 21 (step 9). When subscriber interface is found normal, relay T is released so as to return back to ordinarily connect subscriber interface 21 to subscriber line 31.

Figure 6:
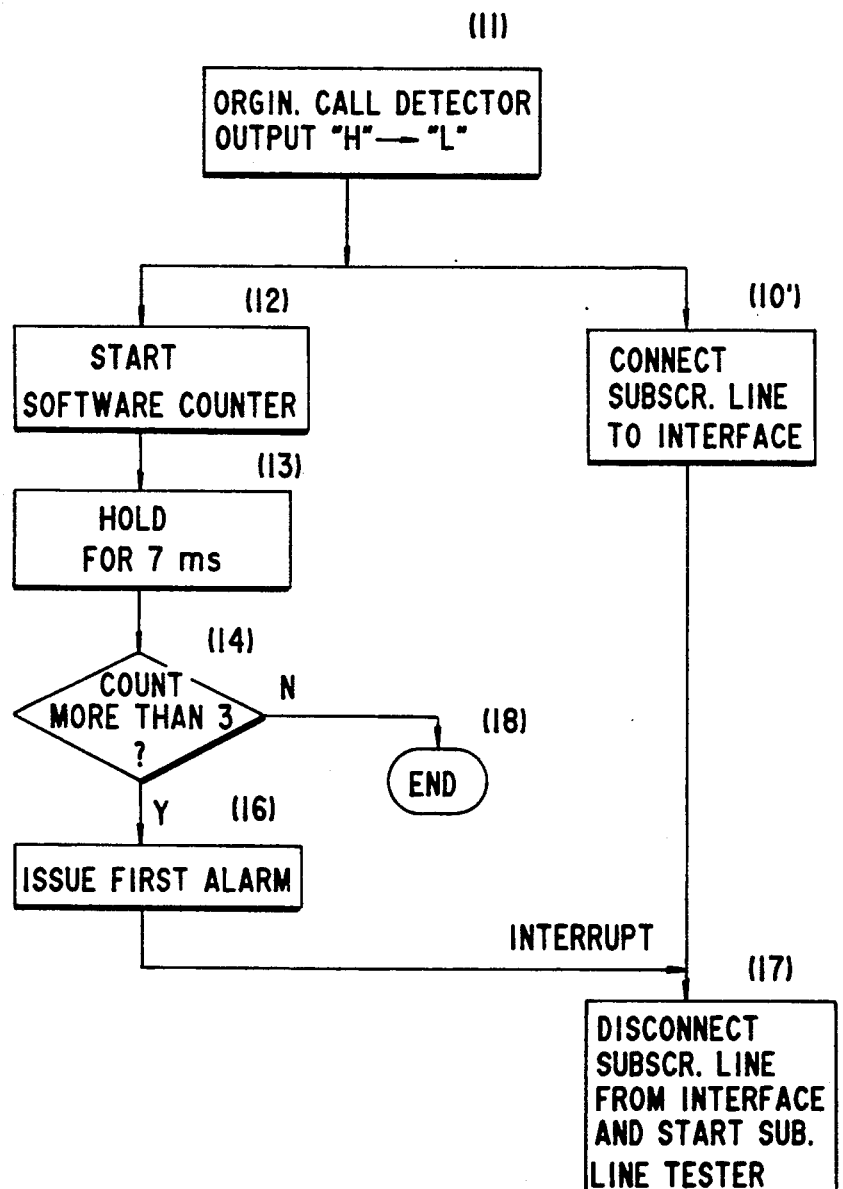
FIG. 6 shows a flow chart of a second preferred embodiment of the discriminating circuit of the present invention.

Operation of CPU1 to discriminate an intermittent voltage is hereinafter described in detail. A first discrimination method employs a software counter as shown in a flow chart of FIG. 5. Upon detecting the transition from "H" to "L" in the line voltage by originating-call detector 211 (step 11) CPU1 starts to count the number of the same H-to-L transitions (step 12) for a predetermined period, for example, 70 ms (step 13). On completion of the predetermined period, thus counted number is compared with a predetermined reference number, for example of this case, 3 (step 14). If the counted number is less than 3, the change in the line voltage is determined to be of an originating-call signal so that the ordinary connection between the subscriber line and the subscriber interface is carried out (step 15). If the counted number is 3 or more, CPU2 issues a first alarm to doubt a power exposure (step 16). A second discrimination method is a variation of the first discrimination method as shown in a flow chart of FIG. 6, where the same steps are denoted with the same step numbers. Upon detecting the transition from "H" to "L" in the line voltage (step 11) CPU1 starts both to count the number of the same H-to-L transitions (step 12) as well as to start an ordinary operation to connect the subscriber line to the subscriber interface (step 10'). Upon recognizing an intermittent voltage, the first alarm to doubt the power exposure interrupts the already started ordinary operation so as to switch the connection of the subscriber line from the subscriber interface to the subscriber line tester and to start the subscriber line tester (step 17). If the intermittent voltage is not recognized, this discriminating operation is ended (step 18) so that the already-started ordinary operation (step 10') is continued on. Advantage of the second method is in that the ordinary operation (step 10') can start without waiting for the conclusion of the software counter.

Though a software counter is referred to as the means for discriminating the voltage change continuous or intermittent, it is apparent that a clock which, for example, counts a number of clock pulses between the "H-to-L" transitions in the output of originating-call detector can be employed therefor.

Figure 7:
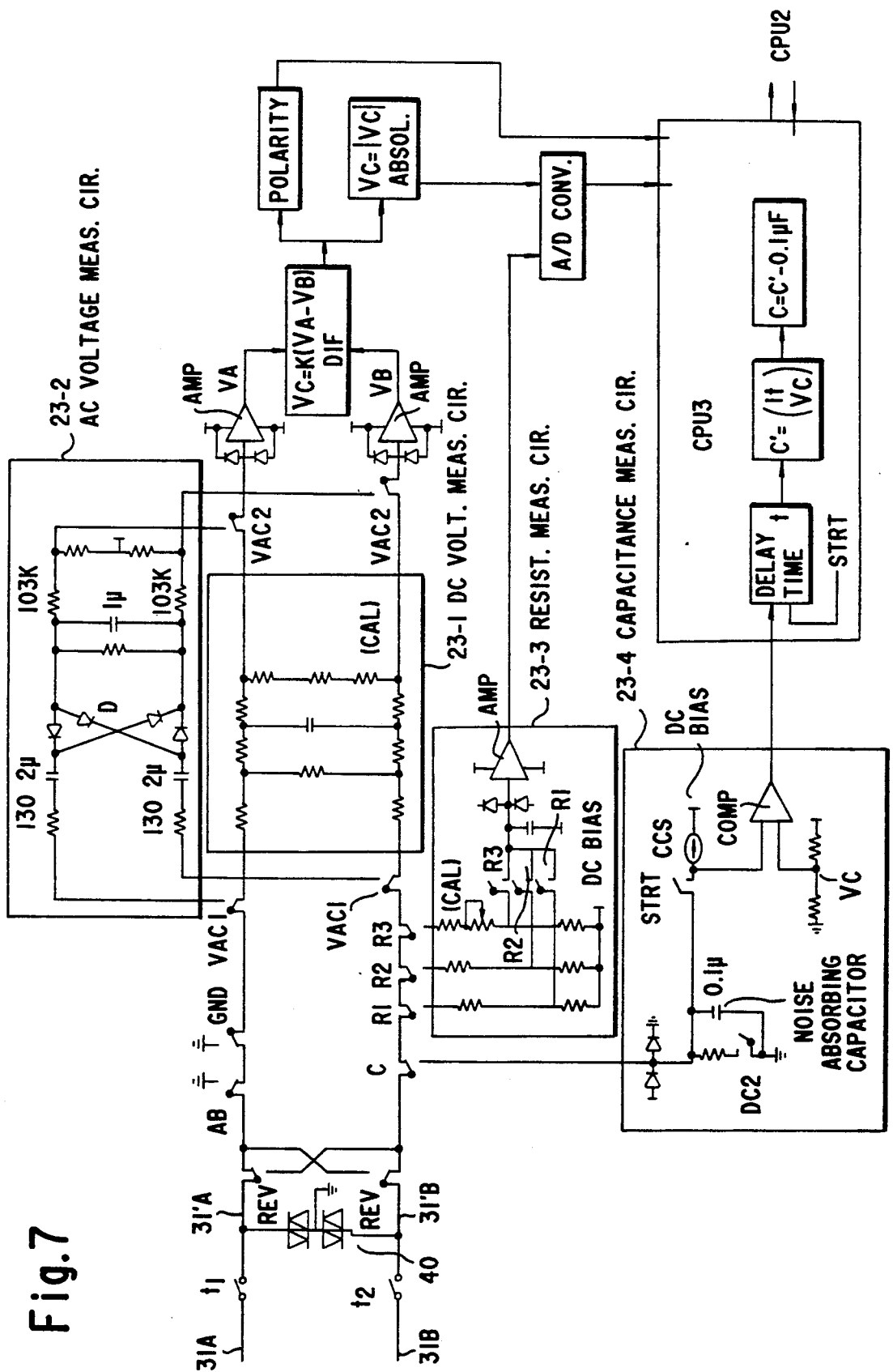
FIG. 7 shows a detailed circuit diagram of a preferred embodiment of a subscriber line tester of the present invention.

Typical circuit configuration of subscriber line tester 23 is shown in detail in FIG. 7, where the numerals given to resistors or capacitors show resistance value in ohm and capacitance value in farad, respectively. Resistors and capacitors which are not essential for explaining their fundamental functions are not given with the resistance value nor the capacitance value. Wires 31'A and 31'B of a subscriber line connecting between contacts $t_1$ and $t_2$ and subscriber interface 21 are respectively provided with surge absorbers 40 between the ground and each of the wires. The state of the switches in FIG. 7 show a case to measure DC voltages. DC voltage measuring circuit 23-1 is of a conventional circuit configuration. Resistors and capacitors are for discharging residual charge on the subscriber line, for absorbing noises on the subscriber line, and for limiting current consumption. DC voltages on each line is individually amplified by amplifier AMP and subtracted from each other to get their difference by a difference circuit DIF, i.e. in order to obtain the voltage between the two wires 31'A and 31'B. Polarity and absolute value of the output of difference circuit are detected. The polarity is input to CPU3. The absolute value is input via an A/D converter to CPU3. By switching a ground switch gnd and reversing switches rev, voltage on each subscriber line with respect to ground level can be individually measured.

For measuring the AC voltage, a pair of switches vac1 and another pair of switches vac2 are turned to AC voltage measuring circuit 23-2, where the AC voltage on the subscriber line are rectified by diodes D via 130Ω resistors, 2 μF capacitors and a 1 μF capacitor. Thus, the 1 μF capacitor is charged up to the peak value of the rectified AC voltage. The DC voltage across the 1 μF capacitor is measured through high impedance resistor as high as 103 kΩ, in the same way as those of the DC voltage measuring circuit. AC voltages between ground and each of wires can also be measured by the same way as those in measuring the DC voltages. Due to such a low impedance configuration of the rectifying circuit, the AC voltage measuring circuit 23-2 does not erroneously detect an AC voltage induced from a nearby AC line.

For measuring insulation resistance of each wire of the subscriber line, a switch ab is turned to ground, and one pair of three pairs of switches r1, r2 and r3 are selectively turned. DC voltage drop across a resistor generated by a current flowing from a DC bias source through the wires of subscriber line is amplified by amplifier AMP, whose output voltage is input via the A/D converter to CPU3. Appropriate resistance range is chosen by selecting proper pair of switches r1, r2 and r3. Thus, the isolation resistance between two wires 31A and 31B is measured. However, if some leakage exist between one of the wires to ground, the resistance caused from the leakage can not be separated. The wire to be grounded is selected by turning the switch pair rev.

For measuring capacitance switch operations are the same as those of measuring the resistances except that switch c is turned in stead of switch r1, r2 or r3. On closing a switch strt, a constant current generated by a constant-current source CCS charges capacitance C of a selected one of the wires 31A or 31B through the resistors selected by switch r1, r2 or r3 from a DC bias voltage source. Due to the constant current characteristics of the charging current, the voltage induced on the wire rises gradually. Comparator COMP detects the moment at which the rising voltage reaches a predetermined reference voltage Vc, so as to cause a transition in its output. CPU3 measures the time delay after closing the switch strt to the moment of the transition of the comparator. This delay time t is translated into a capacitance value C' from a reference curve prepared in advance. Capacitance value 0.1 μF of the capacitor provided for absorbing a noise must be reduced from the capacitance value C' obtained from the reference curve. These operations are carried out in CPU3. Thus, the capacitance C between one wire and ground can be measured, and the capacitance C between the two wires can be obtained; however, the capacitance between the ground and the wire connected to switch c can not be separated therefrom.

The subscriber line tester has been conventionally provided to watch the health of the subscriber line. In the present invention, the subscriber line tester, the AC voltage measuring circuit 23-2 is particularly utilized to confirm the power exposure.

In the method of detecting a power exposure of a subscriber line according to the present invention, no additional hardware, i.e. no additional circuit, is required at all to the currently employed system. The required are the program installed in CPU1 for discriminating the voltage continuous or intermittent, and the program installed in CPU2 mainly for managing the subscriber line tester to confirm the power exposure. Thus, the present invention accomplishes an accurate and quick but inexpensive method to detect a power exposure without requiring expensive and bulky components for detecting the AC voltage.

Though in the preferred embodiment of the present invention a plurality of subscriber lines are referred to, it is apparent that the present invention can be embodied in a telephone system of a single subscriber line.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What is claimed is:

1. A communication system comprising a telephone exchanger connected to a subscriber line, wherein the communication system further comprises:

detecting means for detecting a change in a voltage of said subscriber line; and discriminating means for discriminating whether said change detected by said detecting means is continuous or intermittent, upon discriminating said detected change in voltage as intermittent said discriminating means outputting a first alarm signal.

2. A system as recited in claim 1, wherein the communication system further comprises a transmission apparatus for connecting said subscriber line and the telephone exchanger, said transmission apparatus comprising said detecting means, said discriminating means and interfacing means for interfacing said subscriber line.

3. A system as recited in claim 2, wherein said transmission apparatus further comprises a plurality of said interfacing means for interfacing a plurality of the subscriber lines to multiplexing/demultiplexing means; said multiplexing/demultiplexing means multiplexes/demultiplexes each of said subscriber lines to/from said transmission line; and said detecting means is provided to each of paired lines of said subscriber line.

4. A system as recited in claim 3, wherein said discriminating means is provided commonly for a plurality of said detecting means.

5. A system as recited in claim 1, wherein
said detecting means comprises a comparator circuit for comparing a level of said change in voltage on said telephone line with a predetermined threshold level, said comparator circuit outputting a portion having a level higher than said threshold level, and
said discriminating means comprises a digital processor means controlled by a program stored in memory means attached to said digital processor means so as to discriminate whether said detected change is continuous or intermittent; said discriminating means outputs a first alarm signal upon discriminating said change intermittent.

6. A system as recited in claim 5, wherein said digital processor means measures a continuing period of said portion so as to discriminate whether said change in voltage is of a continuous signal or of an intermittent signal.

7. A system as recited in claim 5, wherein said digital processor means counts a number of said changes in voltage for a predetermined period so as to discriminate whether said change in voltage is of a continuous signal or of an intermittent signal.

8. A system as recited in claim 7, wherein said digital processor means counts said number of said changes in voltage by means of a software counter.

9. A system as recited in claim 2, wherein said transmission apparatus further comprises:
switch means for breaking connection of said subscriber line from an input terminal of said transmission apparatus, said switch means being actuated by said first alarm signal output from said discriminating means.

10. A system as recited in claim 9, wherein said transmission apparatus further comprises:
line testing means for testing statuses of said subscriber line, connection of said subscriber line to said interface means having been switched to said line testing means by said switch means actuated by said first alarm signal, said line testing means being initiated by said first alarm signal.

11. A system as recited in claim 10, wherein said statuses to be tested is at least one selected from: voltages on and between paired lines, electrical resistances between each of said paired lines and between ground and each of said paired lines, and capacitance between each of said paired lines and between ground and each of said paired lines, wherein an power exposure is determined when a predetermined item of said tests exceeds a predetermined threshold level.

12. A system as recited in claim 11, wherein a second alarm signal is transmitted towards said telephone exchanger when power exposure is determined.

13. A communication system comprising a transmission apparatus for connecting a plurality of subscriber lines to a telephone exchanger, the transmission apparatus comprising:
interface means for interfacing each of subscriber lines;
detecting means, in said interface means, for detecting a change in a voltage of said subscriber line;
discriminating means operated by a program installed in a digital processor means, upon discriminating said detected change in voltage as intermittent said discriminating means outputting a first alarm signal; and
line testing means for testing status of said subscriber line, connection of said subscriber line to said interface means having been switched to said line testing means by a switch means actuated by said first alarm signal, operation of said line testing means being initiated by said first alarm signal.

14. A system as recited in claim 13, wherein
said detecting means comprises a comparator circuit for comparing a level of said change in voltage on said subscriber line with a predetermined threshold level, said comparator circuit outputting a portion having a level higher than said threshold level, and
said discriminating means comprises a digital processor means controlled by a program stored in memory means attached to said digital processor means so as to discriminate whether said portion higher than said threshold level being continuous or intermittent.

15. A system as recited in claim 14, wherein said discriminating means is provided commonly for a plurality of said detecting means.

16. A system as recited in claim 13, wherein said detecting means comprises a comparator circuit for comparing a level of said change in voltage on said subscriber line with a predetermined threshold level, said comparator circuit outputting a portion having a level higher than said threshold level, and
said discriminating means comprises a digital processor means controlled by a program stored in memory means attached to said digital processor means so as to discriminate whether said detected change is continuous of intermittent; said discriminating means outputs a first alarm signal upon discriminating said change intermittent.

17. A system as recited in claim 16, wherein said digital processor means measures a continuing period of said portion so as to discriminate whether said change in voltage is of a continuous signal or of an intermittent signal.

18. A system as recited in claim 16, wherein said digital processor means counts a number of said changes in voltage for a predetermined period so as to discriminate whether said change in voltage is of a continuous signal or of an intermittent signal.

19. A system as recited in claim 18, wherein said digital processor means counts said number of said changes in voltage by means of a software counter.

20. A system as recited in claim 13, wherein said statuses to be tested is at least one selected from: voltages on and between each of said paired lines, electrical resistances between each of said paired lines and between ground and each of said paired lines, and capacitance between each of said paired lines and between ground and each of said paired lines, wherein an power exposure is determined when a predetermined item of said tests exceeds a predetermined threshold level.

21. A system as recited in claim 20, wherein a second alarm signal is transmitted towards said telephone exchanger when power exposure is determined.

22. A method to detect a power exposure of a subscriber line of a telephone communication system, comprising the steps of:

detecting a change in a voltage of said subscriber line; and discriminating said change whether said change is continuous or intermittent;

outputting from said discriminating means a first alarm signal, upon discriminating said change as intermittent.

23. A method as recited in claim 22, further comprising the steps of:

switching connection of said subscriber line from the telephone communication system to a line tester;

initiating said line tester upon outputting said first alarm signal;

testing at least one of voltage, resistance and capacitance of said subscriber line; and outputting a second alarm upon a result of said testing exceeding a predetermined limit so as to determining a power exposure.

* * * * *